United States Patent
Melatti et al.

(10) Patent No.: US 10,632,995 B2
(45) Date of Patent: Apr. 28, 2020

(54) VEHICLE LAUNCH MODE CONTROL

(71) Applicant: Ford Global Technologies, LLC, Dearborn, MI (US)

(72) Inventors: Anthony Melatti, Dearborn, MI (US); Patrick Lawrence Jackson Van Hoecke, Dearborn, MI (US); Danielle Rosenblatt, Dearborn, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/009,993

(22) Filed: Jun. 15, 2018

(65) Prior Publication Data
US 2019/0382017 A1    Dec. 19, 2019

(51) Int. Cl.
| B60W 30/18 | (2012.01) |
| B60W 30/08 | (2012.01) |
| B60W 30/095 | (2012.01) |
| B60W 50/08 | (2020.01) |

(52) U.S. Cl.
CPC ...... *B60W 30/18027* (2013.01); *B60W 30/08* (2013.01); *B60W 30/0956* (2013.01); *B60W 50/082* (2013.01); *B60W 2550/10* (2013.01); *B60W 2550/148* (2013.01); *B60W 2720/106* (2013.01)

(58) Field of Classification Search
CPC .......... B60W 30/18027; B60W 30/08; B60W 30/0956; B60W 2550/10; B60W 2550/148; B60W 2720/106; B60W 50/082
See application file for complete search history.

(56) References Cited

U.S. PATENT DOCUMENTS

| 8,144,002 | B2 | 3/2012 | Kiuchi | |
| 8,175,785 | B2* | 5/2012 | Turski | B60T 8/175 180/197 |
| 9,248,834 | B1* | 2/2016 | Ferguson | B60W 30/09 |
| 9,598,009 | B2* | 3/2017 | Christensen | G08G 1/163 |
| 9,740,945 | B2 | 8/2017 | Divekar et al. | |
| 10,473,793 | B2* | 11/2019 | Neubecker | G01S 19/31 |
| 2009/0243880 | A1* | 10/2009 | Kiuchi | G01B 11/26 340/903 |
| 2010/0161188 | A1 | 6/2010 | Turski et al. | |
| 2017/0080948 | A1 | 3/2017 | Lubbers et al. | |
| 2018/0257660 | A1* | 9/2018 | Ibrahim | G01C 21/16 |

FOREIGN PATENT DOCUMENTS

| CN | 204488641 U | 7/2015 |
| WO | 9731810 A1 | 9/1997 |
| WO | 2012024722 A1 | 3/2012 |

* cited by examiner

*Primary Examiner* — Rachid Bendidi
(74) *Attorney, Agent, or Firm* — Frank A. MacKenzie; Bejin Bieneman PLC

(57) ABSTRACT

A system includes a processor and a memory. The memory stores instructions executable by the processor to determine a vehicle launch path based on a specified speed and vehicle physical attributes, and upon detecting an object in the launch path, to deactivate the vehicle launch.

19 Claims, 5 Drawing Sheets

VEHICLE LAUNCH MODE CONTROL

BACKGROUND

A vehicle may be equipped with a launch mode. In a launch mode, the vehicle may accelerate with a predetermined acceleration, e.g., a maximum acceleration that the vehicle powertrain allows. A vehicle launch mode can be used, e.g., on a test track, to determine how quickly a vehicle can reach a specified speed.

DETAILED DESCRIPTION

Introduction

Figure 1:
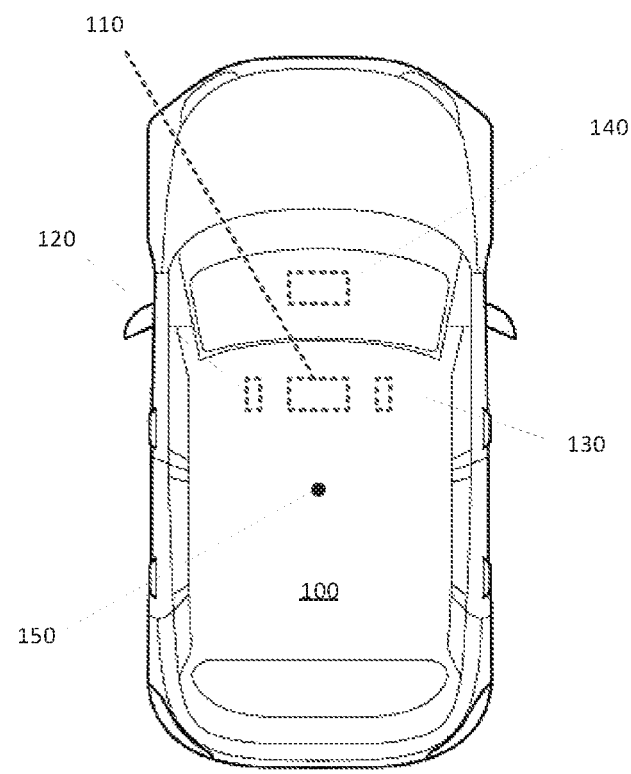
FIG. 1 is a diagram illustrating an example vehicle.

Disclosed herein is a system including a processor and a memory. The memory stores instructions executable by the processor to determine a vehicle launch path based on a specified speed and vehicle physical attributes, and to deactivate the vehicle launch upon detecting an object in the launch path.

The instructions may further include instructions to perform the vehicle launch by accelerating the vehicle to reach the specified speed.

The instructions to perform the vehicle launch may further include instructions to determine a ground surface friction based on vehicle sensor data, and to actuate a vehicle propulsion component based on an ideal acceleration and the determined ground surface friction.

The path may be substantially a straight path.

The instructions may further include instructions to deactivate the vehicle launch upon determining that a distance from the vehicle to the object is less than a length of the launch path.

The instructions may further include instructions to determine a length of the launch path based on the specified speed.

The instructions may further include instructions to determine the length of the launch path based on an average length of a specified number of previous vehicle launches.

The instructions may further include instructions to identify a second object outside the path, to estimate a heading and a speed of the second object, and to deactivate the vehicle launch upon predicting that the second object is an obstacle in the launch path.

The instructions may further include instructions to estimate a likelihood of collision between the vehicle and the second object based on the launch path, the specified speed of the vehicle, the ideal acceleration of the vehicle, a length of the launch path, the heading of the second object, and the speed of the second object, and to predict that the second object is the obstacle upon determining that the estimated likelihood exceeds a predetermined threshold.

Further disclosed herein is a method including determining a vehicle launch path based on a specified speed and vehicle physical attributes, and deactivating the vehicle launch, upon detecting an object in the launch path.

The method may further include performing the vehicle launch by accelerating the vehicle to reach the specified speed.

Performing the vehicle launch may further includes determining a ground surface friction based on vehicle sensor data, and actuating a vehicle propulsion component based on an ideal acceleration and the determined ground surface friction.

The path may be substantially a straight path.

The method may further include deactivating the vehicle launch upon determining that a distance from the vehicle to the object is less than a length of the launch path.

The method may further include determining a length of the launch path based on the specified speed.

The method may further include determining the length of the launch path based on an average length of a specified number of previous vehicle launches.

The method may further include identifying a second object outside the path;

estimating a heading and a speed of the second object, and deactivating the vehicle launch upon predicting that the second object is an obstacle in the launch path.

The method may further include estimating a likelihood of collision between the vehicle and the second object based on the launch path, the specified speed of the vehicle, the ideal acceleration of the vehicle, a length of the launch path, the heading of the second object, and the speed of the second object, and predicting that the second object is the obstacle upon determining that the estimated likelihood exceeds a predetermined threshold.

Further disclosed herein is a system including means for determining a vehicle launch path based on a specified speed and vehicle physical attributes, and means for deactivating the vehicle launch upon detecting an object in the launch path.

The system may further include means for performing the vehicle launch by accelerating the vehicle to reach the specified speed.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

A vehicle includes sensors providing data for object detection. The vehicle includes a launch mode in which a vehicle accelerates to reach a specified speed, e.g., 100 kilometers/hour (kph). The vehicle computer is programmed to predict a vehicle launch path based on a specified speed and vehicle physical attributes, e.g., engine power, and, upon detecting an object in the launch path, to deactivate the vehicle launch.

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI 140). A vehicle 100 has a geometrical center point 150, e.g., points at which respective longitudinal and lateral center lines of the vehicle 100 intersect.

The computer 110 includes a processor and a memory such as are known. The memory includes one or more forms of computer-readable media, and stores instructions executable by the computer 110 for performing various operations, including as discussed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120, a sensor 130, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

The actuators 120 can actuate various vehicle subsystems in accordance with conventional control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc.

The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The sensors 130 may include a variety of devices to provide data to the computer 110. For example, the sensors 130 may include object detection sensors 130 as Light Detection And Ranging (LIDAR) sensor(s) 130, camera sensor(s) 130, radar sensor(s) 130, etc., disposed in and/or on the vehicle 100 that provide relative locations, sizes, shapes of other objects such as other vehicles. Additionally or alternatively, the vehicle 100 may include motion sensors 130, e.g., accelerometers, etc., such as a steering wheel sensor 130, speed sensor 130, etc., that provide one or more physical attributes of the vehicle 100 such as a steering angle, vehicle speed, etc.

The HMI 140 may be configured to receive information from a user, such as a human operator, during operation of the vehicle 100. Moreover, an HMI 140 may be configured to present information to the user. Thus, an HMI 140 may be located in the passenger compartment of the vehicle 100. For example, the HMI(s) 140 may include a turn signal switch. In a non-autonomous mode, the computer 110 may receive a request to initiate a vehicle 100 launch, as discussed below.

Figure 2:
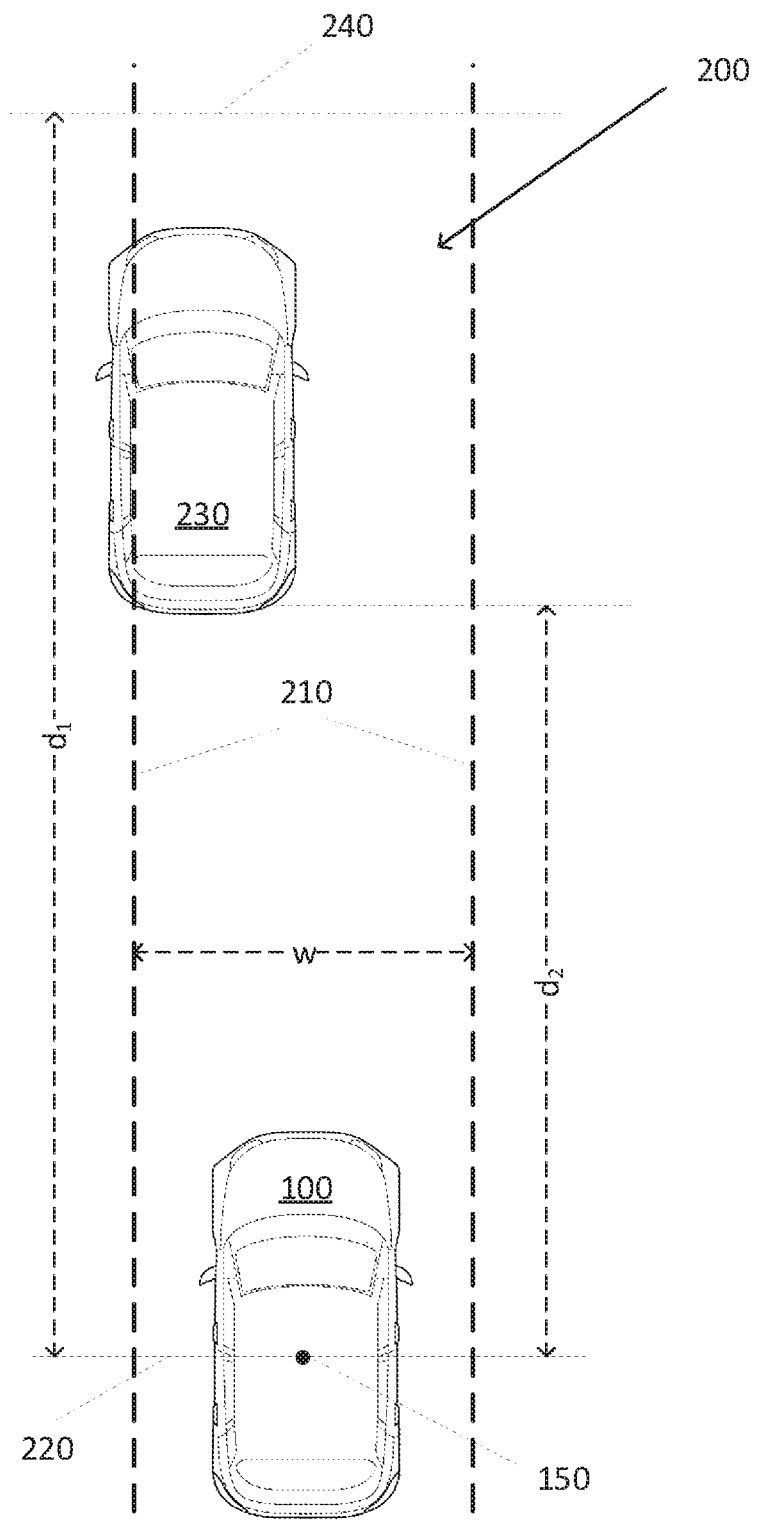
FIG. 2 is a diagram showing the vehicle of FIG. 1 and an object in a launch path.

With respect to FIGS. 1-2, the computer 110 can be programmed to predict (or determine) a vehicle 100 launch path 200 based on a specified speed $V_s$, e.g., 100 km, and vehicle 100 physical attributes, and upon detecting an object 230, e.g., another vehicle, in the launch path 200, to deactivate the vehicle 100 launch.

The computer 110 may be programmed to deactivate the vehicle 100 launch by, e.g., deactivating the vehicle 100 propulsion, actuating a vehicle 100 brake actuator 120, etc.

A vehicle 100 launch mode means operating a vehicle 100 including a vehicle 100 propulsion according to one or more specified rules including at least a rule specifying a target vehicle speed and a target launch time to reach the target vehicle speed. For example, in a launch mode, the vehicle 100 may be expected to reach a specified target speed, e.g., 100 kph, within a target launch time, e.g., 4 seconds. In a vehicle 100 launch, a vehicle 100 is typically accelerated to reach a specified (or nominal) speed, e.g., 100 kph, as quickly as possible. A vehicle 100 launch time $t_s$, is a time duration to reach a specified speed $V_S$ such as 100 kph from an initial speed $V_i$, e.g., 0 (zero) kph. In determining a launch time $t_s$, with reference to equation (1), the vehicle 100 is typically accelerated according to a determined acceleration such as an ideal acceleration $a_i$. The ideal acceleration $a_i$ is an acceleration at which a vehicle 100 can reach a speed $v_s$ from a speed $v_i$ within a specified launch time $t_s$, and is typically a value determined based on vehicle 100 physical properties or attributes, e.g., engine horse power, engine volume, gear ratio of a transmission component, aerodynamic properties of a vehicle 100 body, etc.

$$a_i = \frac{V_s - V_i}{t_s} \tag{1}$$

A launch path 200 is an area, e.g., a rectangular area, with a length $d_1$ having a start location 220, at which the vehicle 100 launch is initiated, typically from a stand-still and an end location 240 at which the vehicle 100 reaches the specified speed $V_s$. A launch path 200 is typically a substantially straight path. The path 200 may be a substantially rectangular area on the ground surface with a width w and the length $d_1$, which is between the start and end locations 220, 240 and border lines 210. The width w may be slightly, e.g., 50%, larger than a vehicle 100 width. For example, the width w may be 6 meters for a vehicle 100 with a width of 4 meters. Alternatively, the launch path 200 may be a curved path and/or may include one or more straight section and curved sections. The border lines 210 represent the area of launch path 200 and not lane markings of a road.

The computer 110 may be programmed to perform the vehicle 100 launch by accelerating the vehicle 100 to reach the specified speed $V_s$, e.g., 100 kph. The computer 110 may be programmed to instruct, e.g., via a vehicle 100 communications bus, a vehicle 100 propulsion actuator 120, e.g., a propulsion component including an electric motor and/or internal combustion engine, to accelerate the vehicle 100, e.g., upon receiving an activation request of launch (launch mode) from the vehicle 100 HMI 140. During the vehicle 100 launch, i.e., while the vehicle 100 is in the launch mode, the computer 110 may control the vehicle 100 operation in an autonomous mode, or in a semi-autonomous mode, e.g., controlling the propulsion and braking of the vehicle 100.

As explained above, the launch time $t_s$ of a vehicle 100 is typically an elapsed time for the vehicle 100 to reach the specified speed $V_s$ after a time $t_i$ at which the launch is initiated or activated. A maximum acceleration of a vehicle 100 is typically specified based on physical properties or attributes, e.g., engine horse power, gear ratio of a transmission component, etc., of vehicle 100 powertrain, etc., however, various factors such as road surface conditions, e.g., ice, rain, etc., and/or vehicle 100 tire properties, may limit an acceleration of the vehicle 100 (i.e., inhibiting acceleration of the vehicle 100 at the ideal acceleration $a_i$). A vehicle 100 acceleration may be reduced due to slippery road and/or worn out vehicle 100 tires. When a vehicle 100 attempts to accelerate on a slippery surface like ice, snow, or loose gravel, the vehicle 100 wheels may slip, which may result tires spinning quickly on the surface of the road without gaining an actual grip, so the vehicle 100 does not accelerate, or accelerates at a slower rate than intended. The vehicle 100 computer 110 may be programmed to provide traction control as is known to help vehicle 100 make effective use of a traction (or friction) available on the road surface. The computer 110 may be programmed to sense that the wheels may slip based on data received from the vehicle 100 sensor(s) 130, e.g., wheel speed sensor(s) 130, and accordingly reduce the vehicle 100 acceleration, e.g., by reducing an amount of requested torque applied to a vehicle 100 propulsion component, e.g., an internal combustion engine controller, to reduce a likelihood of the vehicle 100 wheel(s) slipping on the road surface. Thus, the computer 110 may be programmed to determine a ground surface friction based on vehicle 100 sensor 130 data, and to actuate a vehicle 100 propulsion component based on an ideal acceleration $a_i$ and the determined ground surface friction.

Friction, consistent with its plain and ordinary meaning, is a force resisting a relative motion of solid surfaces and material elements sliding against each other, e.g., a vehicle 100 tire and a road surface. A friction property of two surfaces sliding against one another is typically specified with a friction coefficient $\mu$, which is an empirical property of the contacting materials, e.g., rubber and asphalt. The computer 110 may be programmed to determine the friction properties of the vehicle 100 tire and the road surface based on data received from vehicle 100 sensors 130, e.g., wheel sensor 130, speed sensor 130, temperature sensor 130, camera sensor 130, etc. and/or map data.

$$d_1 = V_i * t_s + \frac{1}{2} a_i t_s^2 \qquad (2)$$

With reference to equation (2) and FIG. 2, the computer 110 may be programmed to determine the length $d_1$ of the launch path 200 based on the initial speed $V_i$, the ideal acceleration $a_i$, and the launch time $t_s$. Thus, the computer 110 may be programmed to determine the length $d_1$ of the launch path 200 based on the specified speed $V_s$ and the launch time $t_s$, e.g., using equations (1) and (2). However, a vehicle 100 may be unable to accelerate with the ideal acceleration $a_i$, e.g., due to slippery conditions of the road, i.e., reduced road friction. A road friction may be reduced when a force between the sliding components, i.e., a force in a direction parallel to the road surface and opposite to (i.e., 180° away from) a vehicle 100 movement direction, exceeds a maximum friction force which causes a slipping of the two materials (or surfaces) against one another. The computer 110 may be programmed to actuate the vehicle 100 propulsion to accelerate the vehicle 100 with substantially a highest amount of acceleration (herein referred to as a specified acceleration, i.e., an actual acceleration specified for the vehicle 100 to implement in the launch mode) that is determined not to result in the vehicle 100 tire slipping on the road surface. In other words, the computer 110 may actuate the vehicle 100 propulsion to accelerate the vehicle 100 such that the force of the vehicle 100 tire is insubstantially, e.g., 5%, less than the maximum friction force between the tire and the road surface. In the present context, this actual acceleration to be used in the launch mode is the specified acceleration. The specified acceleration may be less than or equal the ideal acceleration $a_i$ of the vehicle 100.

Because the specified acceleration of the vehicle 100 can be less than the ideal acceleration of the vehicle 100, the length $d_1$ of the launch path 200 may be variable with respect to at least the road conditions, etc. The computer 110 may be programmed to determine the actual maximum acceleration based on, e.g., road friction, etc., and to determine the length $d_1$ of the launch path 200 using the equation (2) based on the specified acceleration (instead of the ideal acceleration $a_i$) and the specified speed $V_s$.

Additionally, a vehicle 100 acceleration may be affected, e.g., an acceleration that the vehicle 100 can attain may be limited, by on wear and tear of vehicle 100 components such as the powertrain or parts thereof, etc. Thus, the length $d_1$ of the launch path 200 may be increased due to a reduction of the vehicle 100 acceleration. In other words, with reference to the equation (1), a reduced acceleration may result in an increased launch time. Additionally or alternatively, the computer 110 may be programmed to determine the length $d_1$ of the launch path 200 based on an average length of a specified number, e.g., 5, of previous vehicle 100 launches. In one example, the computer 110 may be programmed to store the length $d_1$ of the last, e.g., 5, launches in a computer 110 memory. The computer 110 may be programmed to determine the length $d_1$ by calculating an average of the last five stored length values.

In order to prevent an impact or collision of the vehicle 100 and an object 230, the computer 110 may be programmed to deactivate or prevent the vehicle 100 launch upon determining that a distance $d_2$ from, e.g., a geometrical center point 150 of, the vehicle 100 to the object 230 is less than a length $d_1$ of the launch path 200. In other words, upon determining that an object 230 is within the vehicle 100 launch path 200, the computer 110 may be programmed to deactivate or prevent the vehicle 100 launch. Additionally, the computer 110 may be programmed to deactivate the vehicle 100 propulsion and/or to actuate a vehicle 100 brake actuator 120 as a part of a collision prevention operation.

A collision prevention system may typically operate in reaction to an estimated time-to-collision (and/or distance to collision) with an object determined to be less than a threshold. Advantageously, the computer 110, in the present context, is further programmed to proactively prevent an acceleration of the vehicle 100 upon determining that an object 230 is detected in the launch path 200. Thus, the computer 110 may be programmed to prevent a condition in which a collision prevention system may warrant, e.g., an emergency braking, upon determining that a time-to-collision is less than a threshold. Because during a launch mode, the vehicle 100 is typically accelerated at an ideal acceleration (possibly reduced to account for loss of ground friction), then relying on a collision prevention system based on a time-to-collision with an object 230 may pose a safety risk, e.g., a collision prevention system may fail to prevent a collision.

The computer 110 may be programmed to detect the object 230 based on data received from the vehicle 100 sensor(s) 130, e.g., camera, LIDAR, radar, etc. The computer 110 may be programmed to determine the object 230 location based on such received data, and to determine whether the object 230 is within the launch path 200 based on the determined location of the detected object 230. The computer 110 may be programmed to determine the object 230 is within the launch path 200 upon determining that the object 230 is at least partially within (i.e., any point of the object 230 overlaps with or touches) the launch path 200.

Figure 3:
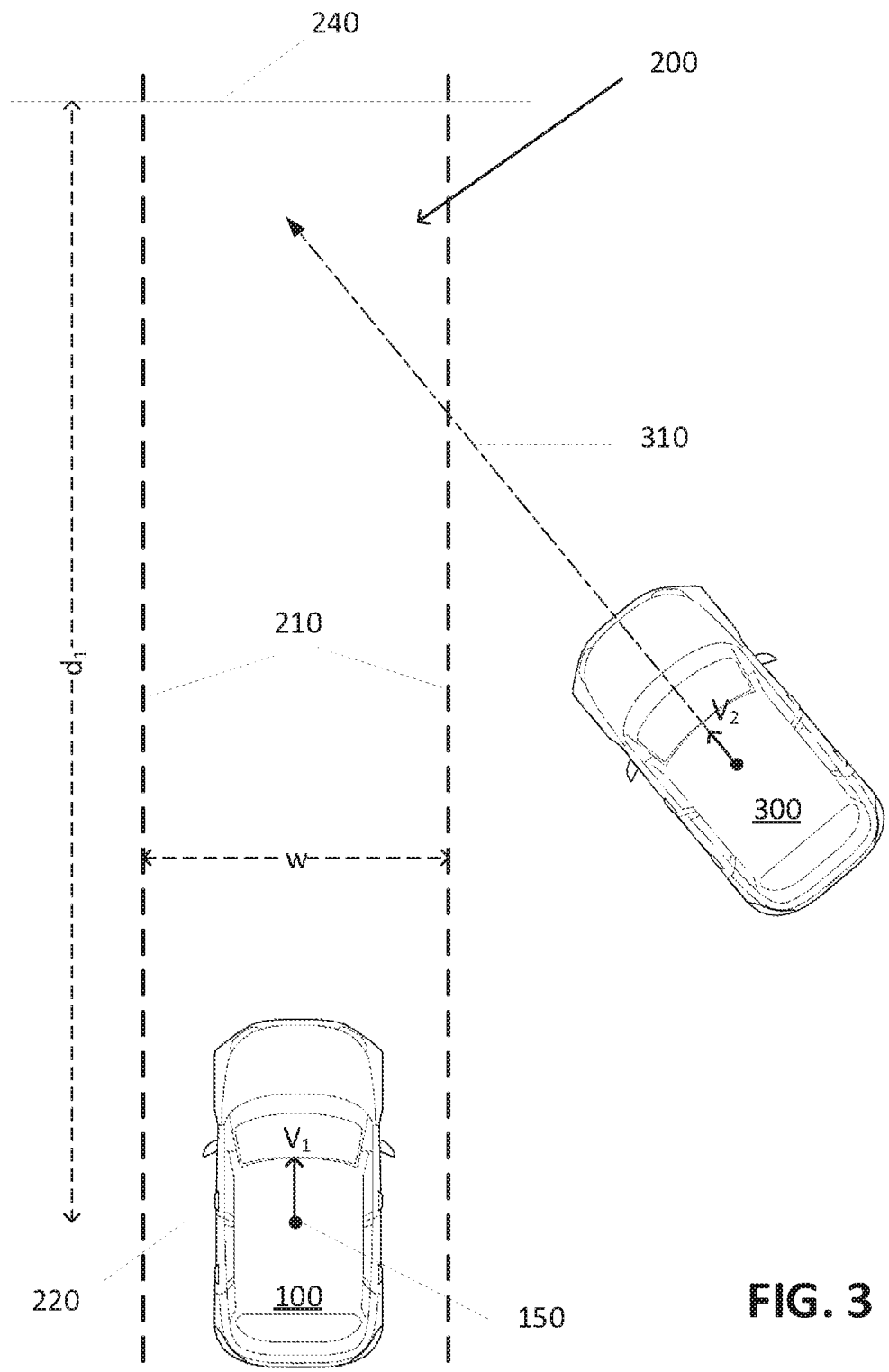
FIG. 3 is a diagram showing the vehicle in the launch path and a second object heading toward the launch path.

As explained above, the computer 110 may be programmed to deactivate the launch mode upon determining that there is an object 230 within the launch path 200. However, as shown in FIG. 3, objects outside the launch path 200 may also pose a risk of collision with the vehicle 100 in the launch path 200. The computer 110 may be programmed to identify a second object 300, e.g., another vehicle, outside the path 200 to estimate a heading $V_2$ and a speed of the second object 300, and, upon predicting that the second object 300 is an obstacle in the launch path 200, to deactivate the vehicle 100 launch. The computer 110 may be programmed to estimate the heading $V_2$ and a speed of the second object 300 using conventional image processing techniques based on data received from the vehicle 100 object detection sensors 130, e.g., LIDAR sensor 130, and data received from the vehicle 100 motion sensor(s) 130, e.g., vehicle speed sensor 130, vehicle yaw rate sensor 130, etc.

The computer 110 may be programmed, to estimate a likelihood of collision between the vehicle 100 with a heading $V_1$ and the second object 300 based on (1) the launch path 200, (2) the specified speed $V_s$ of the vehicle 100, (3) the ideal acceleration $a_i$ of the vehicle 100, (4) the length $d_1$ of the launch path 200, (5) the heading $V_2$ of the second object 300, and (6) the speed of the second object 300. The likelihood of a collision to the second object 300 may be defined as a numerical percentage value between 0% and 100%. The computer 110 may be further programmed to predict the likelihood that the second object 300 is an obstacle in the launch path 200 upon determining that the estimated likelihood exceeds a predetermined threshold, e.g., 50%.

For example, the computer 110 may be programmed to estimate a trajectory 310 of the second vehicle 300 based on the speed and the heading $V_2$ of the second vehicle 300. Upon determining that the predicted trajectory 310 of the second vehicle 300 overlaps or intersects the launch path 200, the computer 110 may be further programmed to determine the likelihood of the collision based on the ideal acceleration $a_i$ of the vehicle 100. In one example, the likelihood of collision of the vehicle 100 and the second object 300 may be determined based on a distance of the vehicle 100 and the second object 300 when the second object 300 is expected to be located in the launch path 200. In one example, the computer 110 may be programmed to determine that a likelihood of a collision with the second object 300 in the launch path 200 exceeds a predetermined threshold, upon determining that the second object 300 is predicted to cross the launch path 200 in a time earlier than the launch time $t_s$, i.e., before the vehicle 100 reaches the end location 240.

Processing

Figure 4A:
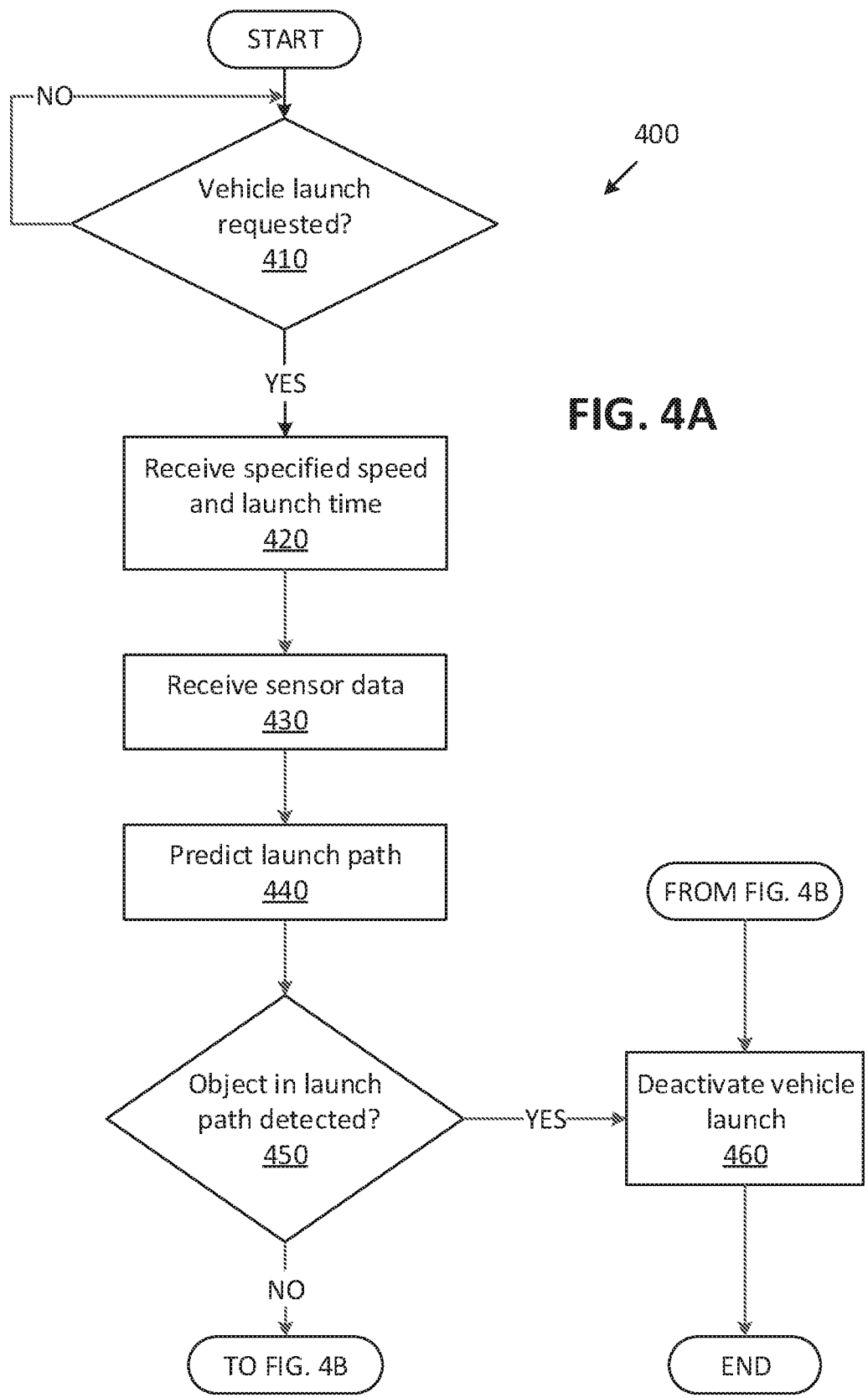
FIGS. 4A-4B are a flowchart of an exemplary process for a vehicle launch.
Figure 4B:
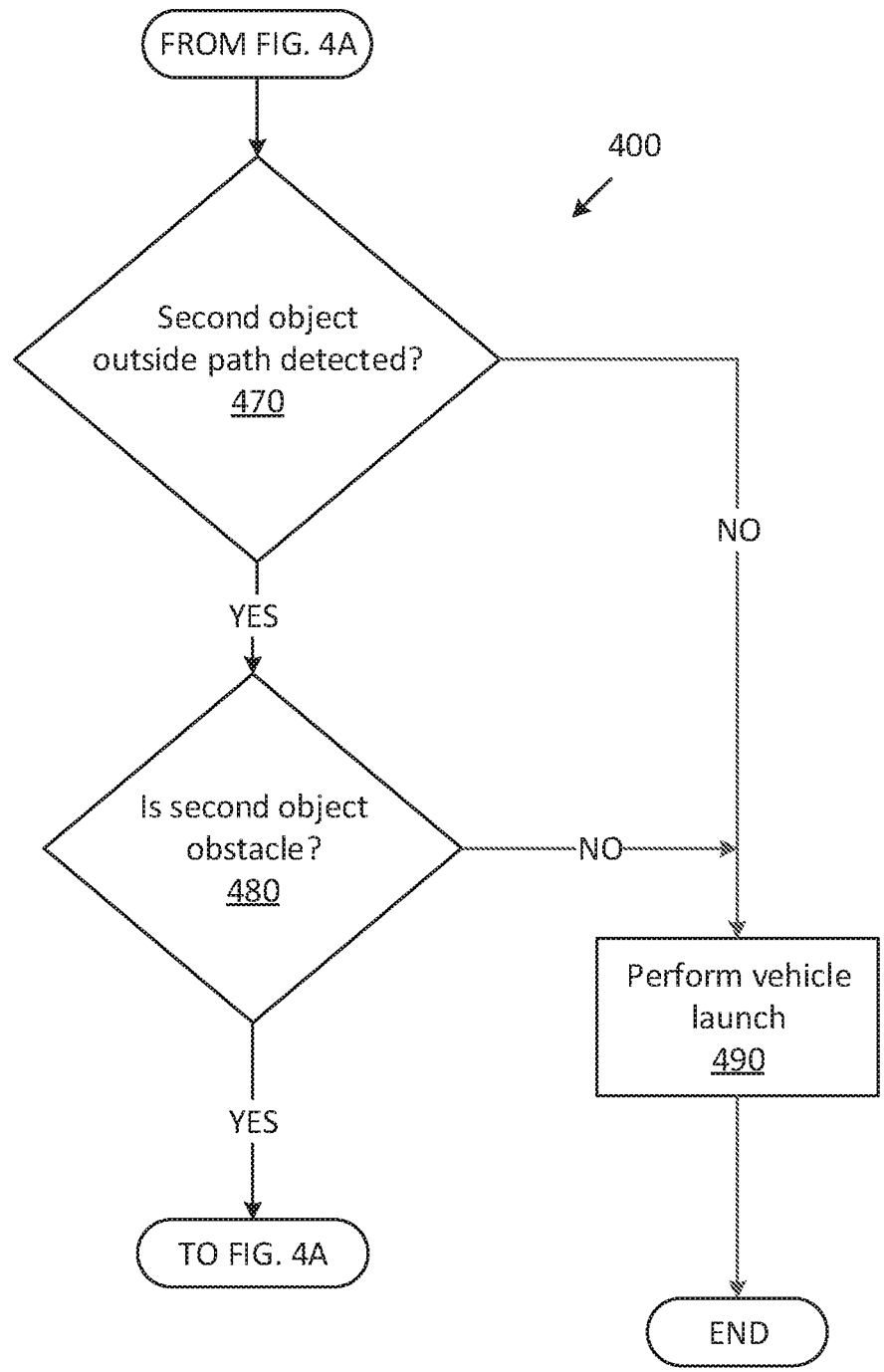

FIGS. 4A-4B are collectively a flowchart of an exemplary process 400 for performing a vehicle 100 launch. The computer 110 may be programmed to execute blocks of the process 400.

The process 400 begins in a decision block 410, in which the computer 110 determines whether a vehicle 100 launch is requested. The computer 110 may be programmed to receive a request for the vehicle 100 launch via the vehicle 100 HMI 140, e.g., a virtual button on a touchscreen, a physical button on an instrument panel or steering wheel, etc. If the computer 110 determines that the request for the vehicle 100 launch is received, then the process 400 proceeds to a block 420; otherwise the process 400 returns to the decision block 410. Otherwise the process 400 remains in the decision block 410 or (although not illustrated) could end, e.g., upon the vehicle 100 being switched off.

In the block 420, the computer 110 receives the specified speed $v_s$ and the launch time $t_s$, e.g., via the vehicle 100 HMI 140. For example, the computer 110 may be programmed to receive a selected specified speed and launch time based on a user selection from a list of previously stored launch configurations. In one example, a launch configuration may include a combination of a specified speed $v_s$, e.g., 80, 100, 120 kph, and an associated launch time $t_s$. e.g., 2, 3, 4 seconds.

Next, in a block 430, the computer 110 receives data from the vehicle 100 sensors 130. For example, the vehicle 100 receives data from the vehicle 100 speed sensor 130, wheel speed sensor 130, camera sensor 130, etc.

Next, in a block 440, the computer 110 determines the vehicle 100 launch path 200. The computer 110 may be programmed to determine the vehicle 100 launch path 200, e.g., using equations (1) and (2). The computer 110 may be programmed to estimate a road friction, to determine a specified acceleration based on the determined road friction, and to determine the length $d_1$ of the launch path 200 based on the specified acceleration using equation (2). Then, the computer 110 may be programmed to determine the launch path 200 (i.e., the area of encompassed within the launch path 200) based on the determined length $d_1$, a pre-stored launch path 200 width w (determined to provide a safe margin of safety for the vehicle 100 encountering objects, e.g., 50% greater than a stored vehicle 100 width), and a direction of vehicle 100 movement (e.g., based on data received from the vehicle 100 steering angle sensor 130, yaw rate sensor 130, etc.). In one example, the launch path 200 is a rectangular area along the heading of the vehicle 100, starting from a start location 220 (e.g., a current location of the vehicle 100) and ending at the end location 240 (the start and end locations 220, 240 having a distance equal to the length $d_1$). Additionally or alternatively, the computer 110 may be programmed to determine the launch time $t_l$ based on an average of a specified number of last performed vehicle 100 launches, as discussed above, and to the determine the launch path 200 based at least in part on the average vehicle 100 launch time $t_s$.

Next, in a decision block 450, the computer 110 determines whether there is an object 230 in the vehicle 100 launch path 200. The computer 110 may be programmed to detect the object 230 based on data received from the vehicle 100 sensors 130 such as LIDAR, camera, radar sensor(s) 130. The computer 110 may be programmed to determine a location of the detected object 230 based on the sensor 130 data and to the determine whether the object 230 is within the launch path 200 upon determining that at least a portion of the object 230 is within the launch path 200. If the computer 110 determines that the detected object 230 is within the launch path 200, then the process 400 proceeds to a block 460; otherwise the process 400 proceeds to a decision block 470 (see FIG. 4B).

In the block 460, the computer 110 deactivates or prevents a vehicle 100 launch. The computer 110 may be programmed to perform one or more of deactivating the vehicle 100 propulsion, actuating a vehicle 100 brake actuator 120, ignoring or terminating a vehicle 100 launch request, etc. Following the block 460, the process 400 ends, or alternatively, returns to the decision block 410, although not shown in FIG. 4A.

Now turning to FIG. 4B, in the decision block 470, the computer 110 determines whether a second object 300 is detected outside the vehicle 100 launch path 200. The computer 110 may be programmed to detect the second object 300 based on data received from the vehicle 100 sensors 130, e.g., LIDAR, radar, camera sensor(s) 130. If the computer 110 detects a second object 300 outside the launch path 200, then the process 400 proceeds to a decision block 480; otherwise the process 400 proceed to a block 490.

In the decision block 480, the computer 110 determines whether the detected second object 300 outside the launch path 200 is an obstacle. The computer 110 may be programmed to determine that the detected second object 300 is an obstacle in the launch path 200, upon determining that a likelihood of a collision with the second object 300 in the launch path 200 exceeds a predetermined threshold, e.g., 50%. The computer 110 may be programmed to determine the likelihood of a collision of the vehicle 100 and the second object 300 based at least in part on the headings $V_1$, $V_2$ of the vehicle 100 and the object 300, the speeds of the vehicle 100 and the second object 300, the launch path 200, and an acceleration of the vehicle 100. For example, the computer 110 may be programmed to determine that a likelihood of a collision with the second object 300 in the launch path 200 exceeds a predetermined threshold, upon determining that the second object 300 is predicted to cross the launch path 200 in a time earlier than the launch time $t_s$, i.e., before the vehicle 100 reaches the end location 240. If the computer 110 determines that the likelihood of the collision of the vehicle 100 and the second object 300 exceeds the specified threshold, then the process 400 proceeds to the block 460 (see FIG. 4A); otherwise the process 400 proceeds to the block 490.

In the block 490, the computer 110 causes performance of the vehicle 100 launch. The computer 110 may be programmed to actuate the vehicle 100 propulsion based on the determined launch path 200 and the determined acceleration, e.g., based on the road friction properties. The computer 110 may be further programmed to deactivate the vehicle 100 propulsion, to actuate the vehicle 100 brakes, etc., upon determining that the vehicle 100 reached the specified speed and/or the end location 240 of the launch path 200. Following the block 490, the process 400 ends, or alternatively, returns to the decision block 410.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine a vehicle launch path based on a specified speed and vehicle physical attributes in a request for a vehicle launch;
   identify an object outside the launch path;
   estimate a heading and a speed of the object;

estimate a likelihood of collision between the vehicle and the object based on the launch path, the specified speed of the vehicle, an ideal acceleration of the vehicle, a length of the launch path, the heading of the object, and the speed of the object; and predict that the object is an obstacle in the launch path upon determining that the estimated likelihood exceeds a predetermined threshold; and upon predicting that the object is the obstacle in the launch path, deactivate the vehicle launch.

2. The system of claim 1, wherein the instructions further include instructions to perform the vehicle launch by accelerating the vehicle to reach the specified speed upon predicting that there is no obstacle in the launch path.

3. The system of claim 2, wherein the instructions to perform the vehicle launch further include instructions to:
determine a ground surface friction based on vehicle sensor data; and
actuate a vehicle propulsion component based on the ideal acceleration and the determined ground surface friction.

4. The system of claim 1, wherein the launch path is a straight path.

5. The system of claim 1, wherein the instructions further include instructions to deactivate the vehicle launch upon determining that a distance from the vehicle to the object is less than the length of the launch path.

6. The system of claim 1, wherein the instructions further include instructions to determine the length of the launch path based on the specified speed.

7. The system of claim 6, wherein the instructions further include instructions to determine the length of the launch path based on an average length of a specified number of previous vehicle launches.

8. The system of claim 1, wherein the instructions further include instructions to, upon detecting a second object in the launch path, deactivate the vehicle launch.

9. A computer-implemented method, comprising:
determining a vehicle launch path based on a specified speed and vehicle physical attributes in a request for a vehicle launch;
identifying an object outside the launch path;
estimating a heading and a speed of the object;
estimating a likelihood of collision between the vehicle and the object based on the launch path, the specified speed of the vehicle, an ideal acceleration of the vehicle, a length of the launch path, the heading of the object, and the speed of the object; and
predicting that the object is an obstacle in the launch path upon determining that the estimated likelihood exceeds a predetermined threshold; and
upon predicting that the object is the obstacle in the launch path, deactivate the vehicle launch.

10. The method of claim 9, further comprising performing the vehicle launch by accelerating the vehicle to reach the specified speed upon predicting that there is no obstacle in the launch path.

11. The method of claim 10, wherein performing the vehicle launch further includes:
determining a ground surface friction based on vehicle sensor data; and
actuating a vehicle propulsion component based on the ideal acceleration and the determined ground surface friction.

12. The method of claim 9, wherein the launch path is a straight path.

13. The method of claim 9, further comprising deactivating the vehicle launch upon determining that a distance from the vehicle to the object is less than the length of the launch path.

14. The method of claim 9, further comprising determining the length of the launch path based on the specified speed.

15. The method of claim 14, further comprising determining the length of the launch path based on an average length of a specified number of previous vehicle launches.

16. The method of claim 9, further comprising, upon detecting a second object in the launch path, deactivating the vehicle launch.

17. A system, comprising:
means for determining a vehicle launch path based on a specified speed and vehicle physical attributes in a request for a vehicle launch;
means for identifying an object outside the launch path;
means for estimating a heading and a speed of the object;
means for estimating a likelihood of collision between the vehicle and the object based on the launch path, the specified speed of the vehicle, an ideal acceleration of the vehicle, a length of the launch path, the heading of the object, and the speed of the object; and
means for predicting that the object is an obstacle in the launch path upon determining that the estimated likelihood exceeds a predetermined threshold; and
means for, upon predicting that the object is the obstacle in the launch path, deactivate the vehicle launch.

18. The system of claim 17, further comprising means for performing the vehicle launch by accelerating the vehicle to reach the specified speed upon predicting that there is no obstacle in the launch path.

19. The system of claim 17, further comprising means for, upon detecting a second object in the launch path, deactivating the vehicle launch.

* * * * *